（12）United States Patent
Gibbons et al.

(10) Patent No.: US 11,329,999 B1
(45) Date of Patent: May 10, 2022

(54) DETERMINING ENVIRONMENT PARAMETER VALUES USING RENDERED EMOJI ANALYSIS

(71) Applicant: SHAPE SECURITY, INC., Mountain View, CA (US)

(72) Inventors: Kevin Gibbons, Mountain View, CA (US); Michael Ficarra, Sunnyvale, CA (US)

(73) Assignee: F5, Inc., Seattle, WA (US)

( * ) Notice: Subject to any disclaimer, the term of this patent is extended or adjusted under 35 U.S.C. 154(b) by 847 days.

(21) Appl. No.: 16/192,458

(22) Filed: Nov. 15, 2018

Related U.S. Application Data

(60) Provisional application No. 62/754,602, filed on Nov. 2, 2018.

(51) Int. Cl.
*H04L 29/06* (2006.01)
*G06T 7/90* (2017.01)

(52) U.S. Cl.
CPC ............ *H04L 63/1416* (2013.01); *G06T 7/90* (2017.01); *G06T 2207/10024* (2013.01)

(58) Field of Classification Search
CPC .................. H04L 63/1416; G06T 7/90; G06T 2207/10024
See application file for complete search history.

(56) References Cited

U.S. PATENT DOCUMENTS

| | | | | |
|---|---|---|---|---|
| 10,872,133 | B1* | 12/2020 | Kruayatidee | G06F 21/629 |
| 2006/0230344 | A1* | 10/2006 | Jennings | G06F 16/957 |
| | | | | 715/201 |
| 2020/0134401 | A1* | 4/2020 | Hurry | G06F 16/95 |

* cited by examiner

*Primary Examiner* — Jeremy S Duffield
*Assistant Examiner* — Suman Debnath
(74) *Attorney, Agent, or Firm* — Troutman Pepper Hamilton Sanders LLP

(57) ABSTRACT

Techniques are provided for determining environment parameter values based on rendered emoji analysis, A server computer provides a first set of code that, when executed by a browser application at a client computing device, renders a set of emoji at the client computing device, generates a set of rendered graphic data for the set of emoji at the client computing device, and transmits the set of rendered graphic data for each emoji of the set of emoji from the client computing device to the server computer. The server computer receives the rendered graphic data generated at the client computing device, Based on the set of rendered graphic data for the set of emoji generated at the client computing device, the server computer determines a set values for one or more environment parameters of the client computing device.

20 Claims, 7 Drawing Sheets
(2 of 7 Drawing Sheet(s) Filed in Color)

US 11,329,999 B1

DETERMINING ENVIRONMENT PARAMETER VALUES USING RENDERED EMOJI ANALYSIS

CROSS-REFERENCE TO RELATED APPLICATIONS; BENEFIT CLAIM

This application claims the benefit of Provisional Application Ser. No. 62/754,602, filed Nov. 2, 2018, the entire contents of which are hereby incorporated by reference as if fully set forth herein, under 35 U.S.C. § 119(e).

FIELD OF THE DISCLOSURE

The present disclosure generally relates to techniques applicable to client/server systems, and relates more specifically to determining environment parameter values using rendered emoji analysis.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Attackers may use software to imitate a browser and interact with a web server, such as by receiving instructions from the web server and autonomously generating requests based on those instructions. For example, a bot may receive a web page, gather data in one or more objects defined in the web page, and generate a request for another web page to gather additional data, as when a user requests a new web page. A bot may also generate and send a request with data assigned to one or more parameters that correspond to fields in a web page to simulate a user submitting data to a web server through a browser.

When a web server interacts with a user, such as through a browser operating on a client computer, the web server receives and uses information about the operating environment at the client computer. For example, such information may be received in the HTTP header of requests from the client computer, such as in a User Agent string that describes the user. User information may also be requested using web code that is executed by the browser. For example, JavaScript code may be used to obtain a location, IP address, browser software, screen size, cookies, language, and other properties corresponding to the client computer.

However, such information is easily spoofed. For example, software executing at the client computer can generate or modify the User Agent string or other components of the HTTP header. Likewise, software executing at the client computer can modify the values that are reported by JavaScript functions for obtaining user data. Malicious software may provide false information to imitate a legitimate browser. Furthermore, a lack of uniformity for the HTTP header information makes it even more difficult to obtain legitimate information.

Attackers may use bots to commit many types of unauthorized acts, crimes or computer fraud, such as web site or content scraping, ratings manipulation, fake account creation, reserving rival goods attacks, ballot stuffing attacks, password snooping, vulnerability assessments, brute force attacks, click fraud, denial-of-service (DoS) attacks, bidding wars, and system fingerprinting attacks. As a specific example, a malicious user may cause a bot to quickly reserve products that are being offered for sale through a particular web site.

It is relatively common, for example, for illicit organizations to place malware on client computers (e.g. smartphones, tablets, laptops, or desktops) owned by law-abiding people, such as to control those client computers to institute a or to intercept communications between the client and its user, or between the client and a server from which it is getting information and to which it is providing information. For example, such malware may, using a "man in the middle" attack, generate displays in a web browser that look like the legitimate displays from a bank or retail web site, but that act to induce a user to disclose private information (such as bank account or credit card information) that the malware then intercepts and forwards to people who will use the information for illicit gain.

Web server administrators may wish to prevent malicious users from attacking the site, while allowing legitimate users to use the site as intended. However, determining which requests are generated by a legitimate user using a web browser and a malicious user using a bot may be difficult.

SUMMARY

The appended claims may serve as a summary of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee. In the drawings.

Figure 1:
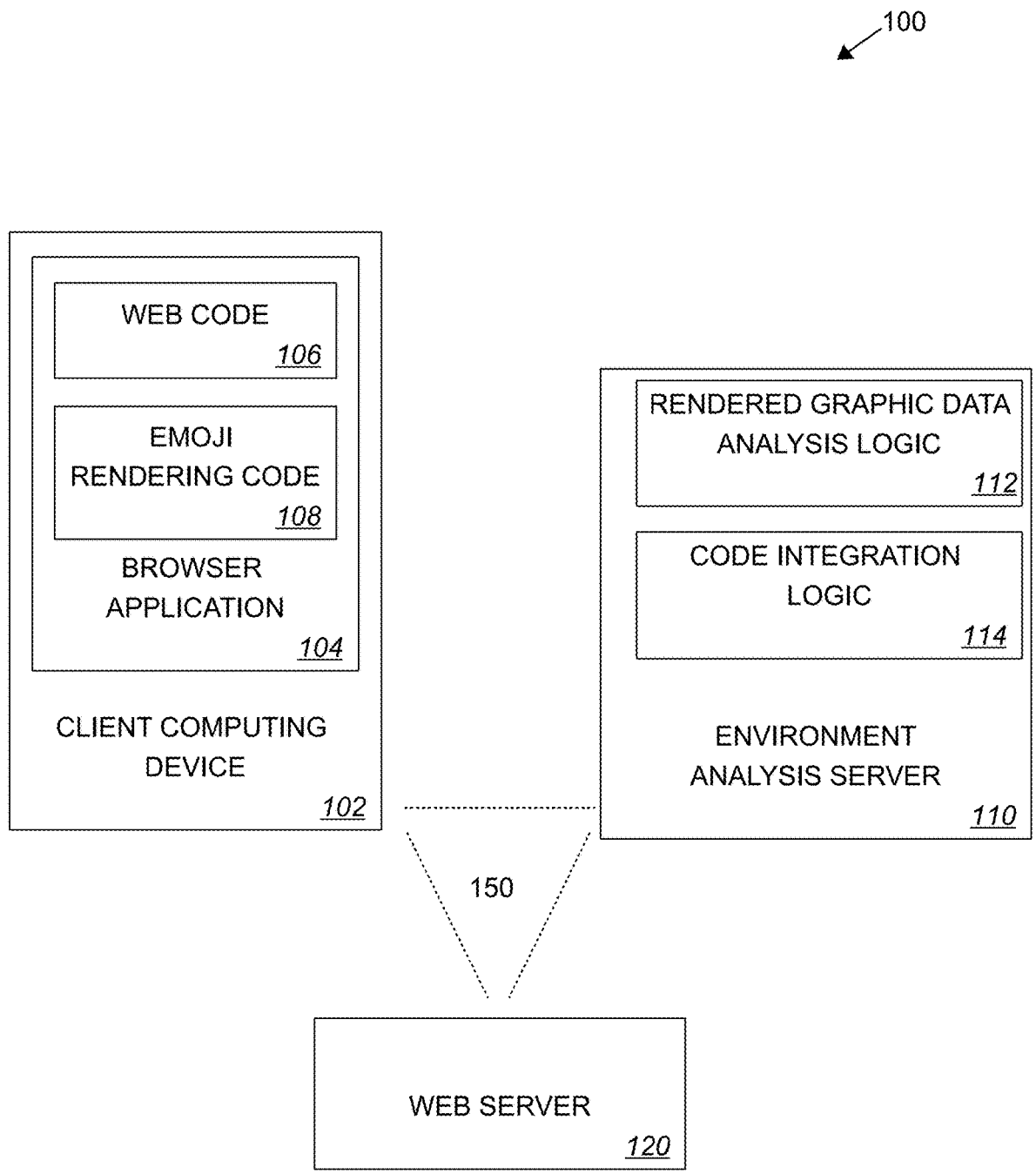
FIG. 1 illustrates a computer system that includes a rendered emoji analysis server in an example embodiment.

While each of the drawing figures illustrates a particular embodiment for purposes of illustrating a clear example, other embodiments may omit, add to, reorder, or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

It will be further understood that: the term "or" may be inclusive or exclusive unless expressly stated otherwise; the term "set" may comprise zero, one, or two or more elements; the terms "first", "second", "certain", and "particular" are used as naming conventions to distinguish elements from each other does not imply an ordering, timing, or any other characteristic of the referenced items unless otherwise specified; the term "and/or" as used herein refers to and encompasses any and all possible combinations of one or more of the associated listed items; that the terms "comprises" and/or "comprising" specify the presence of stated features, but do not preclude the presence or addition of one or more other features.

A "computer" may be one or more physical computers, virtual computers, or computing devices. As an example, a computer may be, or comprise, one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" herein may mean one or more computers, unless expressly stated otherwise.

A "client" refers to a combination of integrated software components and an allocation of computational resources, such as memory, a computing device, and processes on a computing device for executing the integrated software components. The combination of the software and computational resources are configured to interact with one or more servers over a network, such as the Internet. A client may refer to either the combination of components on one or more computers, or the one or more computers (also referred to as "client computing devices").

A "server" refers to a combination of integrated software components and an allocation of computational resources, such as memory and processes on the computing device for executing the integrated software components. The combination of the software and computational resources are dedicated to providing a particular type of function on behalf of clients of the server. A server may refer to either the combination of components on one or more computers, or the one or more computers (also referred to as "server computing devices"). A server may include multiple servers; that is, a server may include a first server computing device and a second server computing device, which may provide the same or different functionality to the same or different set of clients.

When a server performs an action, the action is performed by one or more computers of the server. For example, a web server receiving a request may mean one or more server computers of the website receiving the request. When a website is the indirect object of an action, the action is performed with respect to one or more server computers of the website. For example, sending data to a website means sending data to one or more computers of the website.

When a system of one or more computers performs an action, the action is performed by the one or more computers of the system. When a system of one or more computers is the indirect object of an action, the action is performed with respect to one or more computers of the system.

General Overview

This document generally describes systems, methods, devices, and other techniques for determining environment parameter values using rendered emoji analysis. Emoji are ideograms that are used in electronic documents, messages, and other communications. Emoji include facial expressions, common objects, weather, animals, flags, and other symbols. The same emoji may be rendered differently in different computing environments. That is, a rendered emoji at a first computing device may differ from the same emoji when rendered at a second computing device.

In general, emoji rendering analysis is used to detect environment parameters at a client computing device based on how one or more emoji are rendered at the client computing device. For example, the environment parameters may identify an operating system and/or a browser application executing at the client computing device.

An environment analysis server provides emoji rendering code to a browser application executing at a client computing device. The emoji rendering code may be provided along with web code for a web page requested by the browser application at client computing device. When executed by the browser application, the emoji rendering code renders a set of emoji at the client computing device. For example, the emoji rendering code may render the set of emoji in an off-screen area that is not displayed to a user of the client computing device. The set of emoji rendered at the client computing device may be selected to distinguish different values for a set of one or more environment parameters.

The emoji rendering code also generates a set of rendered graphic data that includes rendered graphic data for each emoji rendered at the client computing device. For example, the rendered graphic data may include dominant color data for each rendered emoji, pixel color data for one or more specified pixels of each rendered emoji, or other rendered graphic data.

The environment analysis server receives the rendered graphic data generated at the client computing device and determines a set values for one or more environment parameters of the client computing device based on the rendered graphic data generated at the client computing device. For example, the environment analysis server may compare the rendered graphic data to collected environment data for the set of emoji rendered in different environments.

In some implementations, the various techniques described herein may achieve one or more of the following advantages: a web server may better protect its users and itself from fraudsters; the protection may be provided relatively simply for the web server in certain implementations, such as by using a security service provider; in particular implementations, such security can be added without the content provider having to install any new hardware or software on its own server systems; such security can be provided flexibly by an organization that specializes in web security, which can in turn keep the security updated to address changes in environment parameters and rendering in different environments; such a security organization can also integrate environment parameter detection with other security countermeasures. Additional features and advantages are apparent from the specification and the drawings.

System Overview

FIG. 1 illustrates a computer system that includes an environment analysis server in an example embodiment. Computer system 100 includes at least one environment analysis server 110, a plurality of client computing devices such as client computing device 102, and at least one web server 120. The client computing device 102, the web server 120, and the environment analysis server 110 communicate over one or more networks 150, such as the Internet. In some embodiments, the network/s 150 may include one or more Local Area Networks (LAN). The network arrangement and connectivity between the client computing device 102, the web server 120, and the environment analysis server 110 may vary. For example, an in-line configuration and an out-of-band configuration for a server that performs rendered emoji analysis are described in greater detail hereinafter.

The client computing device 102 includes a browser application 104. As used herein, the term "browser application" refers to any client application that interacts with web servers over the Internet, such as by sending requests and receiving responses using the HTTP protocol. A browser application may include a stand-alone browser for execution on a computing device, a mobile browser for execution on a mobile computing device, an in-app browser that is integrated into another application, a web crawler application, a headless browser, other automated bots and/or other automated software, and any other software application that interacts with web servers over the Internet.

The browser application 104 is capable of requesting content over a network, such as web code 106 served by the web server 120. As used herein, the term "web code" refers to any instructions that can be parsed, interpreted, and/or executed by a browser application, such as browser application 104. The web server 120 is configured to serve content to the client computing device 102 and other client computing devices. The content may include web code 106 corresponding to a web page. As used herein, the term "web page" refers to any document that is suitable for parsing, interpreting, and/or display by a browser application, such as browser application 104. A web page may include web code, such as web code 106. In response to a request for the web page from the browser application 104, the browser application 104 receives and executes the web code 106 by executing the corresponding instructions at the client computing device 102.

The browser application 104 may also execute emoji rendering code 108. For example, the emoji rendering code 108 may include web code that the browser application 104 can execute by executing the corresponding instructions at the client computing device 102. The emoji rendering code 108 may be received from the environment analysis server 110.

The environment analysis server 110 is configured to determine environment parameter values at the client computing device using rendered emoji analysis. The environment analysis server 110 includes code integration logic 114. The code integration logic 114 generates, integrates, and/or otherwise provides emoji rendering code 108 so that the emoji rendering code 108 is executed at the client computing device 102. The emoji analysis server 110 may directly provide the emoji rendering code 108 to the client computing device 102. Alternatively and/or in addition, the emoji rendering code 108 may be provided to one or more other computing devices that cause transmission of the emoji rendering code 108 to the client computing device 102.

In some embodiments, the code integration logic 114 provides the emoji rendering code 108 in response to a request for a web page from the browser application 104. The emoji rendering code 108 may be provided to the browser application 104 with the web code 106. For example, the emoji rendering code 108 may be integrated with web code 106 for the web page such that when the web code 106 for the web page is executed, the emoji rendering code 108 is also executed. In some embodiments, the web code 106 may be modified to directly include the emoji rendering code 108. Alternatively and/or in addition, the web code 106 may be modified to obtain the emoji rendering code 108 when the web code 106 is executed by the browser application 104.

When the emoji rendering code 108 is executed by the browser application 104, the browser application 104 renders a set of emoji at the client computing device 102, generates a set of rendered graphic data for the set of emoji, and transmits the rendered graphic data for each emoji of the set of emoji from the client computing device 102. The set of rendered graphic data may include rendered graphic data for each emoji of the set of emoji at the client computing device 102. The operation of the emoji rendering code 108 at the client computing device 102 is described in greater detail hereinafter.

The environment analysis server 110 includes rendered graphic data analysis logic 112. When the environment analysis server 110 receives the rendered graphic data generated at the client computing device 102, the rendered graphic data analysis logic 112 determines a set values for one or more environment parameters of the client computing device 102 based on the rendered graphic data generated at the client computing device 102 when the emoji rendering code 108 is executed by the browser application 104. Rendered emoji analysis is described in greater detail hereinafter.

Emoji

Emoji are ideograms that are used in electronic documents, messages, and other communications. Emoji include facial expressions, common objects, weather, animals, flags, and other symbols. The Unicode standard is a standardized system for encoding text consistently across different computer systems. Emoji character sets have been incorporated into the Unicode standard, thereby allowing for their broad use and transmission. In subsequent versions of the Unicode standard, emoji may be added and deleted from the emoji character set.

Typically, a computing device renders an emoji and displays a rendered graphical representation when displaying an emoji character, referred to herein as a "rendered emoji". The exact appearance of the rendered emoji is not set by the Unicode standard. In some implementations, software at the computing device renders emoji as an outline, while in other cases, it may render the emoji as a full-color image. Some emoji fonts include renderable emoji described in a vector format, such as the XML-based Scalable Vector Graphics (SVG) format.

Examples described herein will reference particular emoji in the emoji character set defined under the Unicode standard, but embodiments are not limited to emoji included in the Unicode standard. For example, in some embodiments, an emoji may include character representation of any ideogram that can be displayed as a rendered emoji by a computing device.

Environment Parameters

When an emoji is rendered at a client computing device 102, an environment at the client computing device 102 will affect how the emoji is rendered. That is, a rendered emoji at a first computing device may differ from the same emoji when it is rendered at a second computing device. The environment at the client computing device 102 may include one or more hardware elements of the client computing device 102 and/or software applications running on the client computing device 102. The set of emoji rendered at the client computing device 102 may be selected to distinguish different values for a set of one or more environment parameters. Selecting the set of emoji for detecting environment parameters is described in greater detail hereinafter.

As used herein, the term "environment parameter" refers to a characteristic that describes the environment at one or more computing devices, such as client computing device 102. For example, environment parameters may describe one or more hardware elements and/or software applications running on one or more client computing devices.

As used herein, the term "environment parameter value" describes the environment parameter at a particular client computing device. For example, an environment parameter may be "Operating System", while the environment parameter value for this environment parameter at a particular computing device may be "Android 2.2.1".

In some embodiments, environment parameters detected using rendered emoji analysis include identifying information for an operating system executing at the client computing device 102, which may include version information for the operating system. An operating system is system software on a computing device, such as client computing device 102, that manages computer hardware and software resources. An operating system may enable the computing device to run other applications. Examples of operating systems include, but are not limited to, Windows, Linux, Unix, Mac OS, Android, iOS, including versions thereof.

In some embodiments, environment parameters detected using rendered emoji analysis include identifying information for the browser application 104 at the client computing device 102 that executes the emoji rendering code 108, which may include versioning information for the browser application 104. Examples of browser applications include, but are not limited to Internet Explorer, Microsoft Edge, Mozilla Navigator, Safari, Chrome, Mozilla Firefox, Opera, including versions thereof.

Rendered Graphic Data

When the emoji rendering code 108 is executed by the browser application 104 at the client computing device 102, the emoji rendering code 108 renders a set of emoji and generates a set of rendered graphic data for the set of emoji. For example, the emoji rendering code may generate rendered graphic data for each emoji of the set of emoji rendered at the client computing device 102. In some embodiments, the emoji rendering code 108 causes the browser application 104 to render the set of emoji in an off-screen area that is not displayed to a user of the client computing device 102. For example, one or more emoji in the set of emoji may be rendered in an off-screen canvas element that is not displayed. The emoji rendering code 108 may specify a size of the rendered emoji, such as by specifying a font size, canvas size, or other dimensions. For example, the size specified may be selected to avoid rendering a reduced fidelity version of the emoji at the client computing device 102.

The set of rendered graphic data for the set of emoji is generated based on the rendering of the set of emoji at the client computing device 102. The rendered graphic data has properties that are based on the environment of the client computing device 102. For example, when the set of emoji rendered is selected to distinguish different values for a set of one or more environment parameters, the emoji rendering code 108 will generate rendered graphic data that is usable to determine the particular environment of the client computing device 102.

The rendered graphic data may include data that describes a rendered emoji image at the client computing device 102. In some embodiments, the rendered graphic data includes dominant color data for each emoji in the set of emoji as rendered at the client computing device 102. Dominant color data is described in greater detail hereinafter. In some embodiments, the rendered graphic data includes pixel color data for one or more specified pixels of each rendered emoji at the client computing device 102. The pixel color data for a particular specified pixel may include a value for a particular channel of a color space. Pixel color data is described in greater detail hereinafter.

Dominant Color Data

In some embodiments, the rendered graphic data generated by the emoji rendering code 108 at the client computing device 102 includes dominant color data for each rendered emoji in the set of emoji rendered at the client computing device 102. Dominant color data includes any data that describes one or more colors that are prevalent in a rendered image. A dominant color may be described as a color value in a color space, a range of color values in a color space, a color name for a particular color value or a range of color values, or other identifiers usable to describe a color or a range of colors in a rendered image.

Dominant color/s in a rendered image may be determined by one or more techniques such as but not limited to binning, histograms, clustering, or any other technique or algorithm that can be used to analyze dominant colors in a rendered image. In some embodiments, one or more dominant colors in a rendered emoji are identified using K-means clustering on individual pixels of the rendered emoji. The clustering may be performed in a color space used by the browser application 104 to render the emoji, such as an RGB color space or an RGBA color space. The RGBA color space is the combination of an RGB color model with an extra 4th alpha channel to represent opacity by allowing an image to be combined over another image using alpha compositing, with transparent areas and anti-aliasing of the edges of opaque regions.

Figure 2:
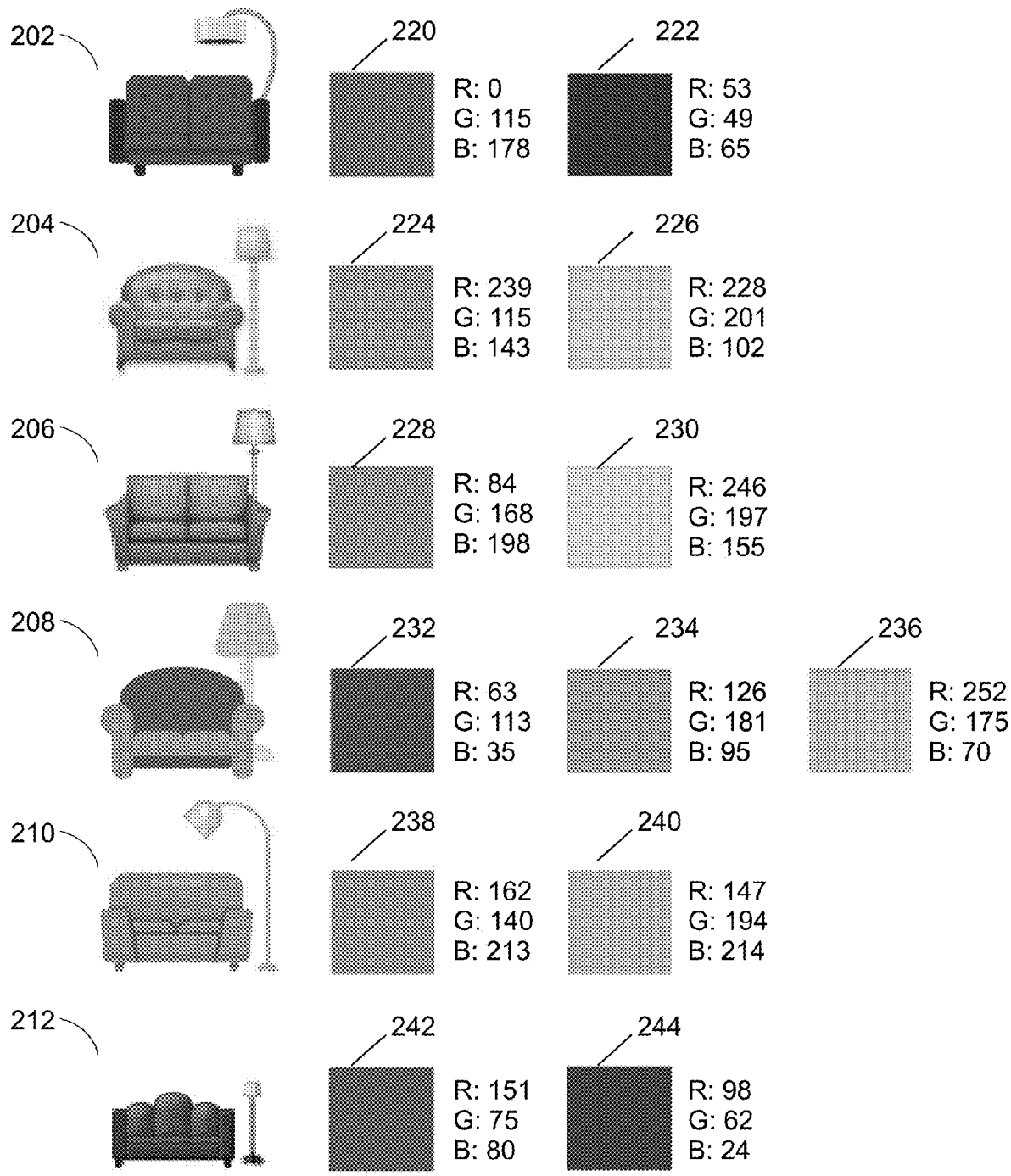
FIG. 2 illustrates rendered graphic data that includes dominant color data for renderings of an emoji in different environments in an example embodiment.

FIG. 2 illustrates rendered graphic data that includes dominant color data for renderings of an emoji in different environments in an example embodiment. The emoji labeled "Couch and Lamp" (with a formal Unicode representation of U+1F6CB) was approved as part of Unicode 7.0 in 2014. Rendered emoji 202-212 represent the "Couch and Lamp" emoji as rendered in different environments.

Dominant color data for rendered emoji 202 describes dominant colors 220-222. Dominant color data for rendered emoji 204 describes dominant colors 224-226. Dominant color data for rendered emoji 206 describes dominant colors 228-230. Dominant color data for rendered emoji 208 describes dominant colors 232-236. Dominant color data for rendered emoji 210 describes dominant colors 238-240. Dominant color data for rendered emoji 212 describes dominant colors 242-244. An example description of dominant colors 220-244 in the RGB color space is provided for each dominant color 220-244. In each channel (R (red), G (green), and B (blue)) of the RGB color space, a value in the range [0, 255] indicates the intensity of the color channel for the corresponding dominant color 220-244.

A rendered image may have one or more dominant colors. In some embodiments, a different number of dominant colors may be determined for different rendered emoji in the set of emoji. For example, the "Couch and Lamp" rendered emoji 208 has three dominant colors 232-236 in a particular environment, as opposed to the rendered emoji 202, 204, 206, 210, and 212, which are renderings of the "Couch and Lamp" emoji in other environments.

When clustering is performed to determine a set of one or more dominant colors, a representative dominant color may be selected to represent a particular cluster. The representative dominant color may be a median color value, an average color value, or another value that is representative of the cluster. In some embodiments, the dominant color data includes information about the prevalence of each dominant color in the rendered emoji 202-2012. For example, the dominant color data may include a sorted list of values representing the dominant colors in a rendered emoji 202-212, where the sorted list indicates which color is more prevalent in the rendered emoji 202-212. The clustering technique or other technique used to determine the dominant color data may be configured to identify a particular number of dominant colors. Alternatively and/or in addition, the clustering technique/s may be configured to identify dominant colors based on a threshold of the prevalence of the dominant color in the rendered emoji 202-212.

Pixel Color Data

In some embodiments, the rendered graphic data generated by the emoji rendering code 108 at the client computing device 102 includes pixel color data for one or more specified pixels of each rendered emoji in the set of emoji. Pixel color data includes any data that describes a characteristic of a particular pixel and/or a particular group of pixels in a rendered image. For example, the pixel color data may describe a color value at a particular pixel. In some embodiments, the pixel color data for a specified pixel includes one or more values for one or more particular channels of a color space used to render the corresponding emoji at the client computing device 102.

Figure 3:
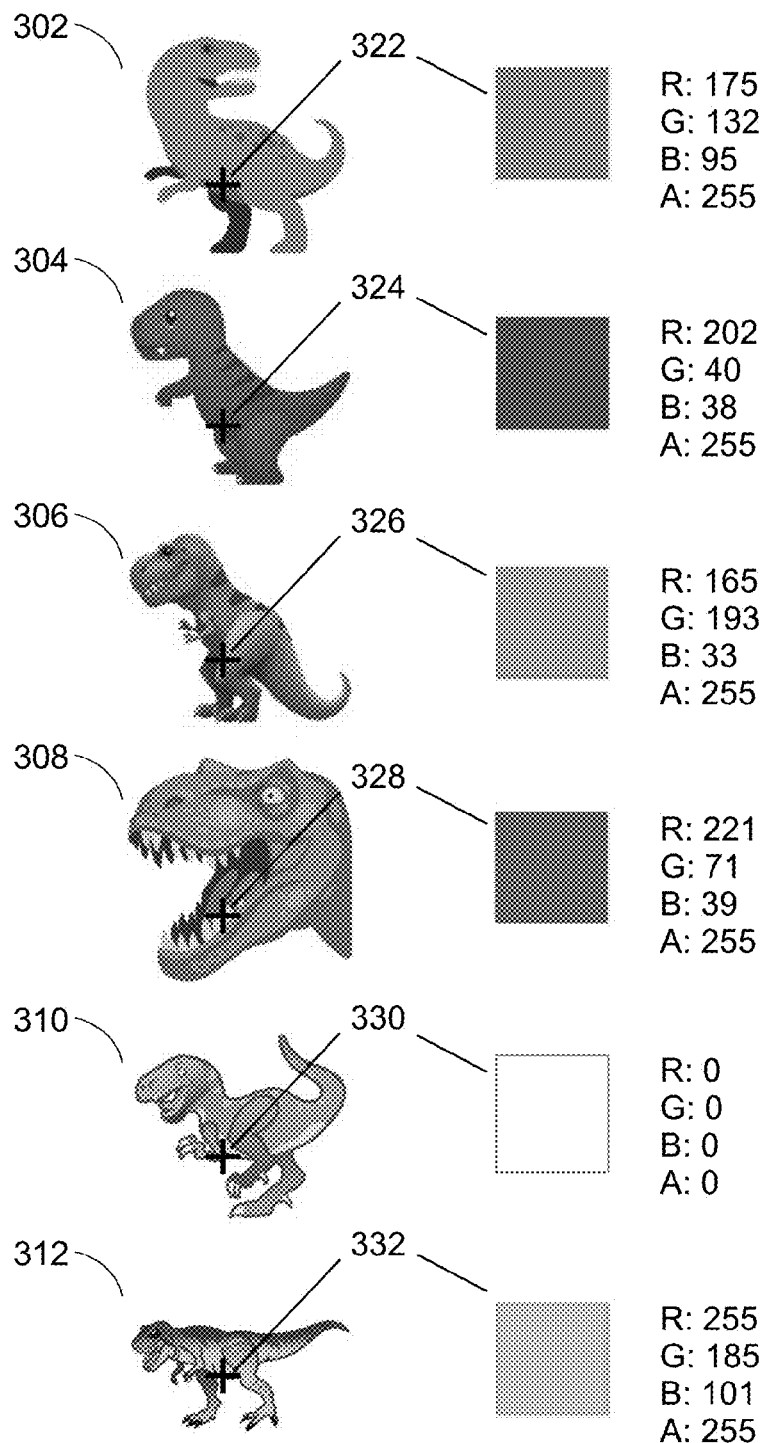
FIG. 3 illustrates rendered graphic data that includes pixel color data for renderings of an emoji in different environments in an example embodiment.

FIG. 3 illustrates rendered graphic data that includes pixel color data for renderings of an emoji in different environments in an example embodiment. The emoji labeled "T-Rex" (with an assigned Unicode code point of U+1F996) was approved as part of Unicode 10.0 in 2017. Rendered emoji 302-312 represent the "T-Rex" emoji as rendered in different environments.

Pixel color data for rendered emoji 302-312 is determined at a specified pixel 322-332. For example, each rendered emoji 302-312 may be rendered in a graphical element with the same dimensions, and the specified pixel 322-322 in each rendered emoji 302-312 may be located at the same position within the different rendered emoji 302-312.

In some embodiments, an emoji component triple may be used to define the pixel color data for a particular pixel, such as the specified pixel 322-332 for the rendered emoji 302-312. A first component in the emoji component triple identifies a particular emoji, such as by the emoji label, the formal Unicode representation, or another emoji identifier. A second component in the emoji component triple identifies the particular pixel in the rendered emoji, such as by an (x, y) offset in the canvas or another coordinate within the rendered emoji. A third component in the emoji component triple identifies the component or channel in the color space used to render the emoji. In other words, an emoji component triple identifies an emoji-offset-channel combination.

For example, in an RGB color space, the third component in the emoji component triple may identify the R (red) channel, the G (green) channel, or the B (blue) channel. In some embodiments, emoji rendering is defined in an RGBA color space, where the third component in the emoji component triple may also identify the A (alpha) channel, where alpha represents an opacity of the specified pixel 322-332 in the rendered emoji 302-312. A value in the range [0, 255] is shown for each channel R, G, B, and A for the specified pixel 322-332 in the corresponding rendered emoji 302-312. The values shown indicate an intensity of each channel at the specified pixel 322-332. In the case of rendered emoji 310, the specified pixel 330 is transparent, and has an A channel value of 0, which corresponds to a transparent area of the rendered emoji 310.

For instance, an example emoji component triple may include a first component that identifies the "T-Rex" emoji, a second component that identifies an (x, y) location for the specified pixel 322-332 of a "T-Rex" emoji rendered as instructed by the emoji rendering code 108, and a third emoji component that identifies the G (green) channel. When the "T-Rex" emoji is rendered at in an environment corresponding to rendered emoji 302, the pixel color data based on this example emoji component triple is 132 (the G channel value of the specified pixel in rendered emoji 302).

Compared to emoji rendering code 108 that generates dominant color data, emoji rendering code 108 that generates pixel color data may require less mathematical computation in the browser application 104 at the client computing device 102, and may require less rendered graphic data to be transmitted. On the other hand, emoji rendering code 108 that generates dominant color data may be more robust to small changes in the environment at the client computing device 102, such as an environmental factor that causes a small shift in rendering (for example, by 1 pixel).

Determining Environment Parameter Values

After the environment analysis server 110 receives the rendered graphic data generated at the client computing device 102, the rendered graphic data analysis logic 112 determines a set of values for one or more environment parameters of the client computing device 102 based on the rendered graphic data generated at the client computing device 102 when the emoji rendering code 108 is executed by the browser application 104.

For example, the environment analysis server may compare the rendered graphic data to collected environment data for the set of emoji rendered by the emoji rendering code 108. The collected environment data is generated based on rendered graphic data generated in a plurality of environments. For example, the set of emoji may be rendered on a plurality of different computing devices that include devices that each have a known environment that exists in a set of environments that rendered emoji analysis will be used to distinguish. Alternatively and/or in addition, the rendering may occur in an emulated and/or simulated environment. By comparing the rendered graphic data from the client computing device 102 to collected environment data that includes rendered graphic data from known environments, the environment at the client computing device 102 can be determined.

In some embodiments, a comparison data structure is generated based on the collected environment data. For example, comparing the rendered graphic data from the client computing device 102 to the collected environment data may be performed by searching, traversing, or otherwise comparing the comparison data structure to the rendered graphic data from the client computing device 102.

The set of emoji rendered by the emoji rendering code 108 may be selected manually and/or using computational analysis. In some embodiments, the set of emoji are selected to distinguish particular environment parameters in the set of environments that rendered emoji analysis will be used to distinguish. Selecting the set of emoji is described in greater detail hereinafter.

Selecting a Set of Emoji for Rendering on a Client Computing Device

The set of emoji rendered at the client computing device may be selected to distinguish different values for a set of one or more environment parameters. In some embodiments, a plurality of emoji renderings for a plurality of emoji are rendered in a plurality of different environments. The different environments have different values for the set of environment parameters that the selected set of emoji will be used to distinguish. The set of emoji are selected based on analyzing the plurality of emoji renderings. The set of emoji may be selected from a greater set of emoji. For example, the entire emoji character set defined in the Unicode standard may be rendered in a plurality of different environments.

In some embodiments, the set of emoji are selected for the entropy they contribute with respect to the relevant environment parameters. Entropy describes the expected amount of information that can be derived from a particular point of data. For example, when the set of emoji are selected to increase entropy, the same number of emoji can provide more information usable to distinguish the different environment with respect to the relevant environment parameters.

For example, a greedy algorithm may be used to iteratively select emoji that contribute the most entropy of the emoji not yet selected. In some embodiments, after N emoji are selected, the next emoji (N+1) will be selected to maximize the conditional entropy contribution of the next selected emoji. That is, the next emoji selected will maximize the entropy of the set of emoji as compared to the set of emoji before the next emoji is added.

In some embodiments, the renderings of the plurality of emoji in the different environments are processed as image data, such as but not limited to raw bitmap data. Rendered graphic data is generated based on the image data. For example, when the rendered graphic data includes dominant color data, dominant color data may be calculated for each rendered emoji in each different environment. The selection of the set of emoji from the plurality of emoji is determined based on the dominant color data for each emoji-environment combination.

When the rendered graphic data includes pixel color data, pixel color data may be calculated for a plurality of pixels. For example, the pixel color data may be calculated for each pixel of each rendered emoji for each emoji-environment combination. In some embodiments, pixel color data is calculated for each emoji component triple for each emoji-environment combination. That is, data for each environment is obtained for each emoji-offset-channel combination, and the selection of the set of emoji and the corresponding specified pixel/s are determined based on the value for each emoji-offset-channel combination in the different environments.

The set of emoji may be periodically updated. For example, individual environments may change the way that one or more emoji are rendered. Furthermore, emoji may be added and deleted from the Unicode standard or another standard.

Detecting Bad Parameters

The emoji analysis server 110 and/or the web server 120 may receive reported environment parameter values for the one or more environment parameters generated when emoji rendering code 108 is executed at the client computing device 102. In some embodiments, after the environment parameters are determined by the emoji analysis server 110, the emoji analysis server 110 determines whether the environment parameter values reported at the client computing device 102 match the set of one or more environment parameter values determined based on the rendered graphic data. When it is determined that the reported environment parameter values do not match the set of one or more environment parameter values, the emoji analysis server 110 may perform one or more additional actions. For example, the emoji analysis server may log the event, ignore or invalidate a request, transaction and/or session involving the client computing device 102, cause additional security countermeasures to be implemented for the request, transaction, session and/or client computing device 102, report the detected discrepancy to the web server 110, block a request, transaction, session and/or client computing device 102, or take any other remedial action in response to detecting the discrepancy.

In-Line Security Server

Figure 4:
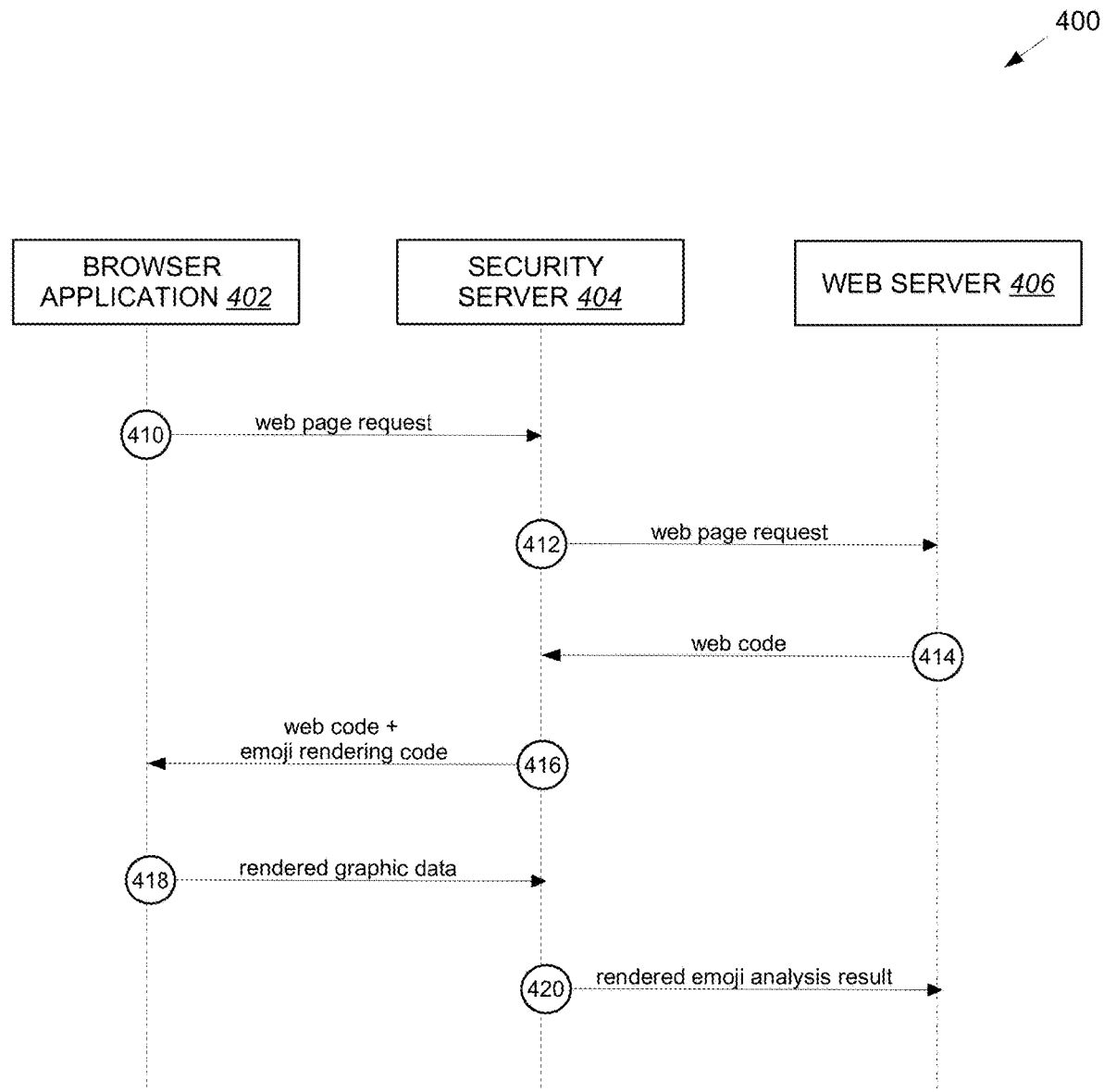
FIG. 4 is an activity diagram of a process for determining environment parameter values using rendered emoji analysis in an example embodiment that utilizes an in-line security server.

FIG. 4 is an activity diagram of a process for determining environment parameter values using rendered emoji analysis in an example embodiment that utilizes an in-line security server. Process 400 involves a client-side browser application 402, a security server 404 that includes an environment analysis server, and a web server 406 that serves a web page. The browser application 402, security server 404, and web server 406 communicate over one or more networks. The security server 404 is positioned in the network as an in-line device. In the in-line security server configuration, requests from the browser application 402 are transmitted to the security server 404, which forwards valid requests for processing by the web server 406.

At step 410, the browser application 402 requests a web page that is served by the web server 406. The web page request is handled by the security server 404. The security server 404 may perform operations to determine whether the web page request is valid with respect to one or more security criteria. At step 412, when the web page request is valid, the security server 404 forwards the web page request to the web server 406.

At step 414, the web server 406 provides web code corresponding to the requested web page to the security server 404. At step 416, the security server 404 provides the web code to the browser application 402 along with the emoji-rendering code. In some embodiments, the emoji-rendering code is inserted in the web code. At step 418, the browser application 402 provides rendered graphic data to the security server 404. For example, execution of the emoji-rendering code at the browser application 402 may cause rendering of emoji, generation of the rendered graphic data, and transmission of the rendered graphic data.

The security server 404 analyzes the rendered graphic data, such as to determine environment parameter values for a client computing device that runs the browser application 402. At step 420, the security server 404 provides a rendered emoji analysis result to the web server 406. In some embodiments, the rendered emoji analysis result may be provided only if abnormal environment parameter values are detected. For example, the environment parameter values detected based on rendered emoji analysis by the security server 404 may differ from self-reported values received from the browser application 402 and/or other software executing at the associated client-computing device.

Out-of-Band Security Server

Figure 5:
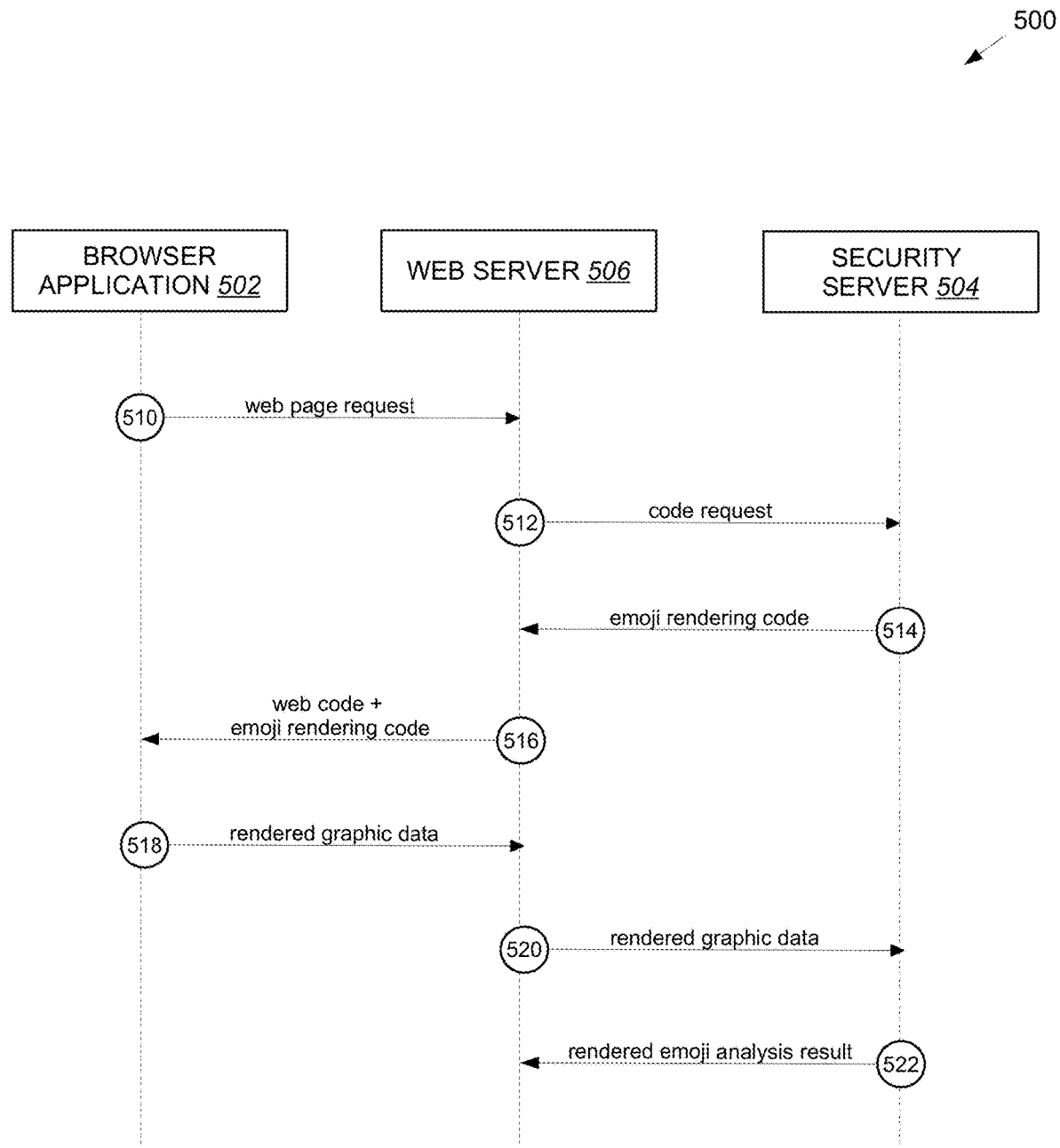
FIG. 5 is an activity diagram of a process for determining environment parameter values using rendered emoji analysis in an example embodiment that utilizes an out-of-band security server.

FIG. 5 is an activity diagram of a process for determining environment parameter values using rendered emoji analysis in an example embodiment that utilizes an out-of-band security server. Process 500 involves a client-side browser application 502, a security server 504 that includes an environment analysis server, and a web server 506 that serves a web page. The browser application 502, security server 504, and web server 506 communicate over one or more networks. The security server 504 is positioned in the network as an out-of-band device. In the out-of-band security server configuration, requests from the browser application 502 are transmitted to the web server 506, while the security server 504 assists with one or more functions, such as but not limited to rendered emoji analysis.

At step 510, the browser application 502 requests a web page that is served by the web server 506. The web page request is handled by the web server 506. At step 512, the web server 506 requests emoji-rendering code that, when executed in the browser application 502, renders a set of emoji, generates rendered graphic data, and transmits the rendered graphic data. In some embodiments, the web server 506 may request the emoji-rendering code independently of receiving the particular web page request from the browser application 502 of step 510. At step 514, the security server 504 provides the emoji-rendering code to the web server 506.

At step 516, the web server 506 provides the web code to the browser application 502 along with the emoji-rendering code. In some embodiments, the emoji-rendering code is inserted in the web code. In some embodiments, step 516 is not performed if the security server 504 determines that the web page request is not valid. For example, the web server 506 may also provide additional information regarding the web page request to the security server 504, and the security server 504 may perform operations to determine whether the web page request is valid with respect to one or more security criteria. The security server 504 may notify the web server 506 when the web page request is not valid based on the additional information.

At step 518, the browser application 502 provides rendered graphic data to the web server 506. The rendered graphic data is generated based on a set of emoji that are rendered at the browser application 502 when the emoji-rendering code is executed in the browser application 502 with the web code. At step 520, the web server 506 forwards the rendered graphic data to the security server 504.

The security server 504 analyzes the rendered graphic data, such as to determine environment parameter values for a client computing device that runs the browser application 502. At step 520, the security server 504 provides a rendered emoji analysis result to the web server 506. In some embodiments, the rendered emoji analysis result may be provided only if abnormal environment parameter values are detected. For example, the environment parameter values detected based on rendered emoji analysis by the security server 504 may differ from self-reported values received from the browser application 502 and/or other software executing at the associated client-computing device.

The in-line security server configuration and out-of-band security server configuration are examples that illustrate steps and/or communications in a non-limiting manner. A server system that performs rendered emoji analysis may include one or more in-line servers, one or more out-of-band servers, and/or other servers configured to detect environment parameter values using emoji rendering analysis.

Example Processes

Figure 6:
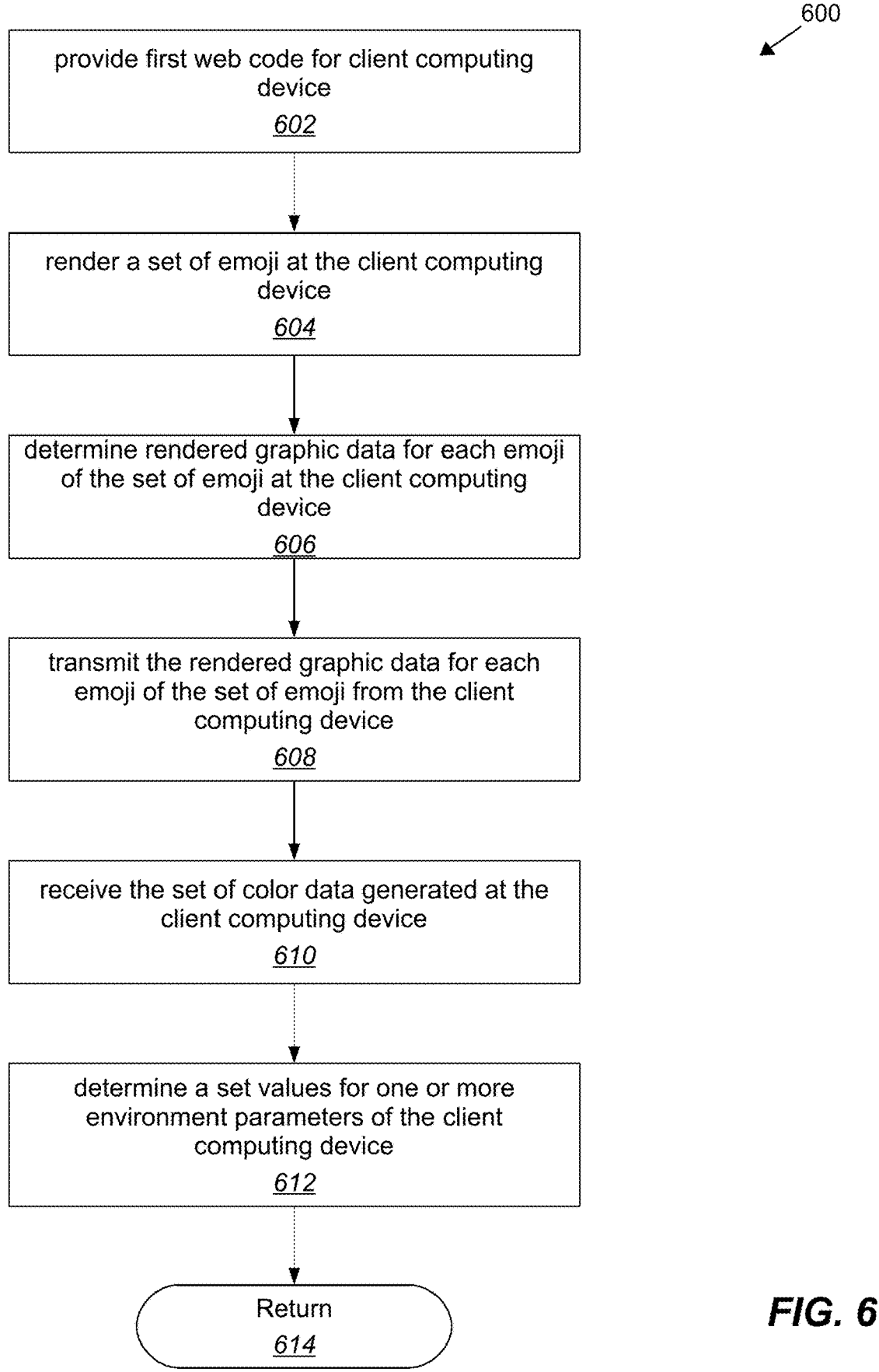
FIG. 6 is a flow diagram of a process for determining environment parameter values using rendered emoji analysis in an example embodiment.

FIG. 6 is a flow diagram of a process for determining environment parameter values using rendered emoji analysis in an example embodiment. Process 600 may be performed by one or more computing devices and/or processes thereof. For example, one or more blocks of process 600 may be performed by a computer system (such as but not limited to computer system 700), an environment analysis server executing on a computing system (such as but not limited to environment analysis server 110), and/or a security server executing on a computing system (such as but not limited to security server 404 and security server 504). Process 600 will be described with respect to environment analysis server 110 and client computing device 102, but is not limited to performance as described in this example.

At block 602, the environment analysis server 110 provides a first set of code for the client computing device 102. When executed by a browser application 104 at the client computing device 102, the first set of code causes the performance of blocks 604-608 at the client computing device 102. In some embodiments, the first set of code is served to the client computing device 102 in response to a request from the client computing device 102. For example, in response to a request for a web page from the client computing device 102, the first set of code may be served to the client computing device with second web code for the web page. Alternatively and/or in addition, the first set of code may be served to the client computing device when the second web code for the web page is executed by the browser application at the client computing device 102.

At block 604, when the first set of code is executed by the browser application 104 at the client computing device 102, the client computing device 102 renders a set of emoji at the client computing device 102. In some embodiments, the first set of code causes the browser application 104 to render the set of emoji in an off-screen area that is not displayed to a user of the client computing device 102.

At block 606, when the first set of code is executed by the browser application 104 at the client computing device 102, the client computing device 102 generates a set of rendered graphic data for the set of emoji. For example, the client computing device 102 may generate rendered graphic data for each emoji of the set of emoji rendered at the client computing device 102. In some embodiments, the rendered graphic data may include dominant color data for each emoji in the set of rendered emoji at the client computing device 102. In some embodiments, the rendered graphic data includes pixel color data for one or more specified pixels of each rendered emoji at the client computing device 102. The pixel color data for a particular specified pixel may include a value for a particular channel of a color space.

At block 608, when the first set of code is executed by the browser application 104 at the client computing device 102, the client computing device 102 transmits the rendered graphic data for each emoji of the set of emoji from the client computing device 102. The client computing device 102 may transmit the rendered graphic data directly to the environment analysis server 110 or to another computing device that forwards the rendered graphic data to the environment analysis server 110.

At block 610, the environment analysis server 110 receives the rendered graphic data generated at the client computing device 102. The environment analysis server 110 may receive the rendered graphic data directly from the client computing device 102 or from another computing device.

At block 612, the environment analysis server 110 determines a set values for one or more environment parameters of the client computing device 102. The environment analysis server 110 determines the set of values for the one or more environment parameters based on the rendered graphic data generated at the client computing device 102. For example, the one or more environment parameters may include identifying information for an operating system executing at the client computing device 102 and/or identifying information for the browser application at the client computing device 102 that executes the web code. The identifying information for the operating system may include version information for the operating system. The identifying information for the browser application may include version information for the browser application.

At block 614, process 600 returns and/or terminates. For example, process 600 may pass control to a calling process, generate any appropriate record or notification, return after a method or function invocation, perform additional emoji analysis functionality for another request and/or client computing device, or terminate.

Implementation Mechanisms—Hardware Overview

According to one embodiment, the techniques described herein are implemented by one or more special-purpose computing devices. The special-purpose computing devices may be hard-wired to perform one or more techniques described herein, including combinations thereof. Alternatively and/or in addition, the one or more special-purpose computing devices may include digital electronic devices such as one or more application-specific integrated circuits (ASICs) or field programmable gate arrays (FPGAs) that are persistently programmed to perform the techniques. Alternatively and/or in addition, the one or more special-purpose computing devices may include one or more general purpose hardware processors programmed to perform the techniques described herein pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices and/or any other device that incorporates hard-wired or program logic to implement the techniques.

Figure 7:
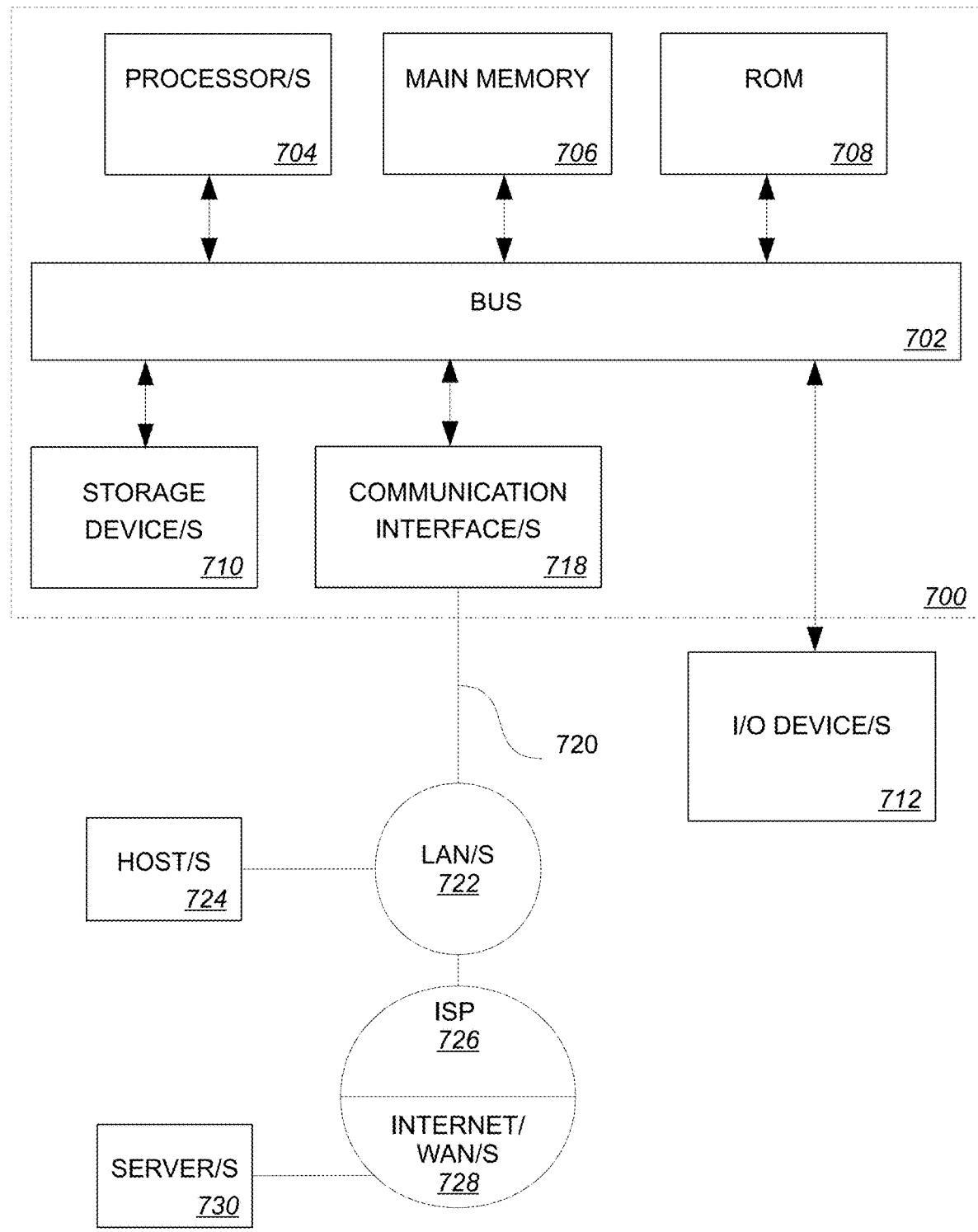
FIG. 7 illustrates a computer system upon which an embodiment may be implemented.

For example, FIG. 7 is a block diagram that illustrates a computer system 700 upon which an embodiment of the invention may be implemented. Computer system 700 includes a bus 702 or other communication mechanism for communicating information, and one or more hardware processors 704 coupled with bus 702 for processing information, such as basic computer instructions and data. Hardware processor/s 704 may include, for example, one or more general-purpose microprocessors, graphical processing units (GPUs), coprocessors, central processing units (CPUs), and/or other hardware processing units.

Computer system 700 also includes one or more units of main memory 706 coupled to bus 702, such as random access memory (RAM) or other dynamic storage, for storing information and instructions to be executed by processor/s 704. Main memory 706 may also be used for storing temporary variables or other intermediate information during execution of instructions to be executed by processor/s 704. Such instructions, when stored in non-transitory storage media accessible to processor/s 704, turn computer system 700 into a special-purpose machine that is customized to perform the operations specified in the instructions. In some embodiments, main memory 706 may include dynamic random-access memory (DRAM) (including but not limited to double data rate synchronous dynamic random-access memory (DDR SDRAM), thyristor random-access memory (T-RAM), zero-capacitor (Z-RAM™)) and/or non-volatile random-access memory (NVRAM).

Computer system 700 may further include one or more units of read-only memory (ROM) 708 or other static storage coupled to bus 702 for storing information and instructions for processor/s 704 that are either always static or static in normal operation but reprogrammable. For example, ROM 708 may store firmware for computer system 700. ROM 708 may include mask ROM (MROM) or other hard-wired ROM storing purely static information, programmable read-only memory (PROM), erasable programmable read-only memory (EPROM), electrically-erasable programmable read-only memory (EEPROM), another hardware memory chip or cartridge, or any other read-only memory unit.

One or more storage devices 710, such as a magnetic disk or optical disk, is provided and coupled to bus 702 for storing information and/or instructions. Storage device/s 710 may include non-volatile storage media such as, for example, read-only memory, optical disks (such as but not limited to compact discs (CDs), digital video discs (DVDs), Blu-ray discs (BDs)), magnetic disks, other magnetic media such as floppy disks and magnetic tape, solid state drives, flash memory, optical disks, one or more forms of non-volatile random access-memory (NVRAM), and/or other non-volatile storage media.

Computer system 700 may be coupled via bus 702 to one or more input/output (I/O) devices 712. For example, I/O device/s 712 may include one or more displays for displaying information to a computer user, such as a cathode ray tube (CRT) display, a Liquid Crystal Display (LCD) display, a Light-Emitting Diode (LED) display, a projector, and/or any other type of display.

I/O device/s 712 may also include one or more input devices, such as an alphanumeric keyboard and/or any other key pad device. The one or more input devices may also include one or more cursor control devices, such as a mouse, a trackball, a touch input device, or cursor direction keys for communicating direction information and command selections to processor 704 and for controlling cursor movement on another I/O device (e.g. a display). This input device typically has at degrees of freedom in two or more axes, (e.g. a first axis x, a second axis y, and optionally one or more additional axes z . . . ), that allows the device to specify positions in a plane. In some embodiments, the one or more I/O device/s 712 may include a device with combined I/O functionality, such as a touch-enabled display.

Other I/O device/s 712 may include a fingerprint reader, a scanner, an infrared (IR) device, an imaging device such as a camera or video recording device, a microphone, a speaker, an ambient light sensor, a pressure sensor, an accelerometer, a gyroscope, a magnetometer, another motion sensor, or any other device that can communicate signals, commands, and/or other information with processor/s 704 over bus 702.

Computer system 700 may implement the techniques described herein using customized hard-wired logic, one or more ASICs or FPGAs, firmware or program logic which, in combination with the computer system causes or programs, causes computer system 700 to be a special-purpose machine. According to one embodiment, the techniques herein are performed by computer system 700 in response to processor/s 704 executing one or more sequences of one or more instructions contained in main memory 706. Such instructions may be read into main memory 706 from another storage medium, such as one or more storage device/s 710. Execution of the sequences of instructions contained in main memory 706 causes processor/s 704 to perform the process steps described herein. In alternative embodiments, hard-wired circuitry may be used in place of or in combination with software instructions.

Computer system 700 also includes one or more communication interfaces 718 coupled to bus 702. Communication interface/s 718 provide two-way data communication over one or more physical or wireless network links 720 that are connected to a local network 722 and/or a wide area network (WAN), such as the Internet. For example, communication interface/s 718 may include an integrated services digital network (ISDN) card, cable modem, satellite modem, or a modem to provide a data communication connection to a corresponding type of telephone line. Alternatively and/or in addition, communication interface/s 718 may include one or more of: a local area network (LAN) device that provides a data communication connection to a compatible local network 722; a wireless local area network (WLAN) device that sends and receives wireless signals (such as electrical signals, electromagnetic signals, optical signals or other wireless signals representing various types of information) to a compatible LAN; a wireless wide area network (WWAN) device that sends and receives such signals over a cellular network access a wide area network (WAN, such as the Internet 728); and other networking devices that establish a communication channel between computer system 700 and one or more LANs 722 and/or WANs.

Network link/s 720 typically provides data communication through one or more networks to other data devices. For example, network link/s 720 may provide a connection through one or more local area networks 722 (LANs) to one or more host computers 724 or to data equipment operated by an Internet Service Provider (ISP) 726. ISP 726 in turn provides connectivity to one or more wide area networks 728, such as the Internet. LAN/s 722 and WAN/s 728 both use electrical, electromagnetic or optical signals that carry digital data streams. The signals through the various networks and the signals on network link/s 720 and through communication interface/s 718 are example forms of transmission media, or transitory media.

The term "storage media" as used herein refers to any non-transitory media that stores data and/or instructions that cause a machine to operate in a specific fashion. Such storage media may include volatile and/or non-volatile media. Storage media is distinct from but may be used in conjunction with transmission media. Transmission media participates in transferring information between storage media. For example, transmission media includes coaxial cables, copper wire and fiber optics, including traces and/or other physical electrically conductive components that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its main memory 706 and send the instructions over a telecommunications line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 can send messages and receive data, including program code, through the network(s), network link 720 and communication interface 718. In the Internet example, one or more servers 730 might transmit signals corresponding to data or instructions requested for an application program executed by the computer system 700 through the Internet 728, ISP 726, local network 722 and a communication interface 718. The received signals may include instructions and/or information for execution and/or processing by processor/s 704. Processor/s 704 may execute and/or process the instructions and/or information upon receiving the signals by accessing main memory 706, or at a later time by storing them and then accessing them from storage device/s 710.

OTHER ASPECTS OF DISCLOSURE

Using the networked computer arrangements, intermediary computer, or processing methods described herein, security in client-server data processing may be significantly increased. Techniques discussed herein effectively reduce attacks. Consequently, one or more various attacks, such as a denial of service ("DOS") attack, credential stuffing, fake account creation, ratings or results manipulation, man-in-the-browser attacks, reserving rival goods or services, scanning for vulnerabilities, or exploitation of vulnerabilities, are frustrated.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer system comprising one or more secure proxy apparatuses, identity provider devices, application servers, or client devices with memory comprising programmed instructions stored thereon and one or more hardware processors configured to be capable of executing the stored programmed instructions to:
   provide, from a server, a first set of code that, when executed by a browser application at a client, renders a set of emoji at the client, generates a set of rendered graphic data for the set of emoji at the client, and transmits the set of rendered graphic data for each emoji of the set of emoji from the client to the server;
   receive, at the server, the rendered graphic data generated at the client;
   based on the set of rendered graphic data for the set of emoji generated at the client, determine, by the server, a set of environment parameter values of the client;
   receive, at the server, a reported environment parameter value for the determined set of environment parameter values generated when the first set of code is executed at the client;
   determine, by the server, wherein the reported environment parameter value match the determined set of environment parameter values determined based on the rendered graphic data; and
   when it is determined that the reported environment parameter value do not match the determined set of environment parameter values, perform, by the server an additional action.

2. The computer system of claim 1, wherein the first set of code is served to the client with a second set of code that is served to the client in response to a request from the client.

3. The computer system of claim 1, wherein the set of environment parameters includes identifying information for an operating system executing at the client and wherein the set of emoji is one or more emojis.

4. The computer system of claim 1, wherein the set of environment parameters includes identifying information for the browser application at the client that executes the first set of code.

5. The computer system of claim 1, wherein the set of environment parameters comprises:
   identifying information for an operating system executing at the client, including version information for the operating system; and
   identifying information for the browser application at the client that executes the first set of code, including version information for the browser application.

6. The computer system of claim 1, wherein the rendered graphic data includes dominant color data for each rendered emoji in the set of emoji rendered at the client.

7. The computer system of claim 1, wherein the set of rendered graphic data includes pixel color data for a specified pixel of each rendered emoji in the set of emoji rendered at the client.

8. The computer system of claim 7, wherein the set of pixel color data for each of the specified pixel includes a value for a particular channel of a color space used in the rendering of the particular emoji at the client.

9. The computer system of claim 1, wherein the first set of code, when executed at the client, renders the set of emoji in an off-screen area that is not displayed to a user of the client.

10. The computer system of claim 1, wherein the one or more instructions, when executed by the one or more hardware processors, cause the one or more processors to:
    analyze an emoji rendering in a different environment, the different environment having different values for the set of environment parameters;
    based on analyzing the emoji rendering, select an emoji to add to the set of emoji based on the entropy contribution of each emoji selected.

11. A method implemented by a network security system comprising one or more secure proxy apparatuses, identity provider devices, application servers, or client devices, the method comprising:
    providing, from a server, a first set of code that, when executed by a browser application at a client, renders a set of emoji at the client, generates a set of rendered graphic data for the set of emoji at the client, and transmits the set of rendered graphic data for each emoji of the set of emoji from the client to the server;
    receiving, at the server, the rendered graphic data generated at the client;
    based on the set of rendered graphic data for the set of emoji generated at the client, determining, by the server, a set of environment parameter values of the client;
    receiving, at the server, a reported environment parameter values for the determined set of environment parameter values generated when the first set of code is executed at the client;
    determining, by the server, wherein the reported environment parameter values match the determined set of environment parameter values determined based on the rendered graphic data; and
    when it is determined that the reported environment parameter values do not match the determined set of environment parameter values, performing, by the server an additional action.

12. The method of claim 11, wherein the first set of code is served to the client with a second set of code that is served to the client in response to a request from the client.

13. The method of claim 11, wherein the set of environment parameters includes identifying information for an operating system executing at the client and wherein the set of emoji is one or more emojis.

14. The method of claim 11, wherein the set of environment parameters includes identifying information for the browser application at the client that executes the first set of code.

15. The method of claim 11, wherein the set of environment parameters comprises:
    identifying information for an operating system executing at the client, including version information for the operating system; and
    identifying information for the browser application at the client that executes the first set of code, including version information for the browser application.

16. The method of claim 11, wherein the rendered graphic data includes dominant color data for each rendered emoji in the set of emoji rendered at the client.

17. The method of claim 11, wherein the set of rendered graphic data includes pixel color data for a specified pixel of each rendered emoji in the set of emoji rendered at the client.

18. The method of claim 17, wherein the set of pixel color data for each of the specified pixel includes a value for a particular channel of a color space used in the rendering of the particular emoji at the client.

19. The method of claim 11, wherein the first set of code, when executed at the client, renders the set of emoji in an off-screen area that is not displayed to a user of the client.

20. The method of claim 11, further comprising:
    analyzing an emoji rendering in a different environment, the different environment having different values for the set of environment parameters;
    based on analyzing the emoji rendering, selecting an emoji to add to the set of emoji based on the entropy contribution of each emoji selected.

* * * * *